United States Patent
Richards et al.

(10) Patent No.: US 9,774,797 B2
(45) Date of Patent: Sep. 26, 2017

(54) MULTI-SENSOR MONITORING SYSTEMS AND METHODS

(71) Applicant: FLIR Systems, Inc., Wilsonville, OR (US)

(72) Inventors: Austin A. Richards, Santa Barbara, CA (US); Daniel Pettersson, Eskilstuna (SE); David Gustafsson, Eskilstuna (SE)

(73) Assignee: FLIR Systems, Inc., Wilsonville, OR (US)

( * ) Notice: Subject to any disclaimer, the term of this patent is extended or adjusted under 35 U.S.C. 154(b) by 241 days.

(21) Appl. No.: 14/689,865

(22) Filed: Apr. 17, 2015

(65) Prior Publication Data

US 2015/0304612 A1    Oct. 22, 2015

Related U.S. Application Data

(60) Provisional application No. 61/981,674, filed on Apr. 18, 2014.

(51) Int. Cl.
*H04N 7/18* (2006.01)
*H04N 5/33* (2006.01)

(52) U.S. Cl.
CPC ............... *H04N 5/33* (2013.01); *H04N 7/188* (2013.01)

(58) Field of Classification Search
CPC .................................. H04N 5/33; H04N 7/188
USPC ........................................................ 348/159
See application file for complete search history.

(56) References Cited

U.S. PATENT DOCUMENTS

| | | | | |
|---|---|---|---|---|
| 4,818,990 A * | 4/1989 | Fernandes | ............... | G01R 15/14 340/12.32 |
| 5,221,964 A * | 6/1993 | Chamberlain | ....... | H04N 5/2253 348/224.1 |
| 6,620,347 B1 * | 9/2003 | Lo Iacono | ................ | C01B 9/08 117/928 |
| 6,788,338 B1 * | 9/2004 | Dinev | .................. | H04N 5/2258 348/222.1 |
| 9,495,613 B2 * | 11/2016 | Holz | ...................... | H04N 5/232 |
| 2003/0150998 A1 * | 8/2003 | Shin | ........................ | G01J 1/429 250/372 |
| 2005/0034655 A1 * | 2/2005 | Lo Iacono | ................ | C01B 9/08 117/200 |

(Continued)

OTHER PUBLICATIONS

Lee et al, Manipulation of Front Dielectric Structure for a High Efficiency Plasma Display Panel, 2005.*

(Continued)

*Primary Examiner* — Shan Elahi
(74) *Attorney, Agent, or Firm* — Haynes and Boone, LLP

(57) ABSTRACT

Systems and methods may be provided for monitoring electrical equipment. A system may include a camera having an ultraviolet light imaging module, an infrared light imaging module, a visible light imaging module, and a processor that combines image data from one or more of the imaging modules. The processor may detect anomalies such as hot spots, corona discharges or failures in the electrical equipment based on the image data. The system may include motion control components that move the camera with respect to the electrical equipment during monitoring operations. The motion control components may include components of a manned or unmanned vehicle that incorporates the camera.

20 Claims, 11 Drawing Sheets

(56) References Cited

U.S. PATENT DOCUMENTS

| | | | |
|---|---|---|---|
| 2007/0102622 A1* | 5/2007 | Olsen | G02B 7/04 250/208.1 |
| 2007/0131869 A1* | 6/2007 | Cole | G01J 1/02 250/372 |
| 2010/0111489 A1* | 5/2010 | Presler | H04N 5/225 386/278 |
| 2010/0208100 A9* | 8/2010 | Olsen | H04N 5/265 348/227.1 |
| 2013/0088620 A1* | 4/2013 | Centen | G01S 7/4863 348/273 |
| 2014/0125815 A1* | 5/2014 | Holz | H04N 5/217 348/169 |
| 2014/0254894 A1* | 9/2014 | Miesak | G06K 9/00013 382/124 |
| 2016/0086055 A1* | 3/2016 | Holz | H04N 5/232 382/103 |
| 2016/0229533 A1* | 8/2016 | van Cruyningen | B64C 31/024 |

OTHER PUBLICATIONS

Li et al, Degradation Behavior and Damage Mechanisms of CCD Image Sensor with Deep-UV Laser Radiation, 2004.*

* cited by examiner

MULTI-SENSOR MONITORING SYSTEMS AND METHODS

CROSS-REFERENCE TO RELATED APPLICATIONS

This application claims the benefit of U.S. Provisional Patent Application No. 61/981,674 filed Apr. 18, 2014 and entitled "MULTI-SENSOR MONITORING SYSTEMS AND METHODS" which is hereby incorporated by reference in its entirety.

TECHNICAL FIELD

One or more embodiments of the invention relate generally to imaging systems and, more particularly, to monitoring electrical equipment with imaging systems.

BACKGROUND

Electrical distribution equipment such as power lines and associated switchgear components can suffer from various types of anomalies such as excessive heating, corona discharges and corona failures. These anomalies can be caused by faulty equipment such as dirty insulators, broken strands on a transmission line, or a cracked bushing on a distribution transformer. Early detection of such anomalies can reduce the risk of power failures or dangerous conditions such as downed power lines or fires.

Corona detection imaging systems have been developed based on image intensifiers with shortwave ultraviolet transparent windows and photocathodes such as bi-alkali or multi-alkali photocathodes with shortwave ultraviolet responsiveness. However, these systems typically generate low resolution images and are typically operated at a high operating gain that results in poor image quality. In particular, ultraviolet images captured by conventional corona detection imaging systems commonly include noise in the form of bright artifacts that occur continuously in random parts of the image. These artifacts can be difficult to distinguish from a corona event. It can therefore be difficult or impossible to perform automatic detection of corona events using conventional imaging systems, due to false alarms generated in response to image artifacts. It can also be difficult or impossible to distinguish between different types of electrical anomalies using the relatively low resolution images generated by conventional systems.

Moreover, because electrical distribution systems extend over large distances, it can be difficult to provide frequent manned inspections of electrical equipment, particularly in remote locations. It would therefore be desirable to be able to provide improved electrical equipment monitoring systems.

SUMMARY

A system may be provided for monitoring electrical equipment such as high-voltage electrical equipment according to one or more embodiments. The system may include an imaging system such as a camera in accordance with an embodiment. The camera may include one or more imaging modules for capturing images in response to incoming light of various wavelengths.

According to an embodiment, the imaging modules may include an ultraviolet camera module for capturing ultraviolet (UV) images, an infrared camera module for capturing infrared (IR) images, and/or a visible light camera module for capturing visible light images. The imaging modules may have a common boresight.

According to an embodiment, the camera may be mounted on a mobile platform such as a handheld mobile device or a manned or unmanned vehicle. In one embodiment, the camera may be mounted to a manned or unmanned aircraft such as a helicopter. The helicopter may be flown along power lines extending over large distances. The camera may be used to capture images of high-voltage equipment such as the power lines and associated switchgear along the lines. The system may include memory and one or more processors that cooperate to detect anomalies associated with electrical equipment in the captured images, according to an embodiment. For example, UV images may be used to detect corona discharges and/or corona failures. Infrared images may be used, for example, to detect excessive heating of electrical equipment. In some embodiments, visible images may be combined with infrared and/or UV images to help localize the source of such anomalies.

According to an embodiment, each imaging module may include one or more lenses and one or more image sensing components. The UV camera may include, for example, a lens and one or more optical elements that direct ultraviolet light from the lens onto one or more image sensing components such as an ultraviolet light sensor and a visible light sensor. In some embodiments, images from the visible light and ultraviolet light sensors in the UV camera may be combined to form enhanced and/or combined images that help orient a viewer of the images to the locations of UV hot spots due to corona events.

The invention disclosed herein is defined by the claims, which are incorporated into this Summary by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Systems and methods are disclosed for multi-wavelength imaging in accordance with one or more embodiments. For example, a multi-wavelength imaging system may include imaging components that are sensitive to light having wavelengths in two or more portions of the electromagnetic spectrum. According to an embodiment, the multi-wavelength imaging system may be implemented in an electrical equipment monitoring and/or inspection system. The multi-wavelength imaging system may include ultraviolet imaging components, visible light imaging components, infrared imaging components, and/or other imaging components (as examples). In some embodiments, the multi-wavelength imaging system may be mounted on a mobile platform such as a helicopter drone for inspecting power lines over large distances. The multi-wavelength imaging system may include on-board image analysis circuitry for detecting equipment problems and/or may include communications circuitry for transmitting images such as multi-wavelength, images to a human operator or remote processing equipment in accordance with various embodiments.

Figure 1:
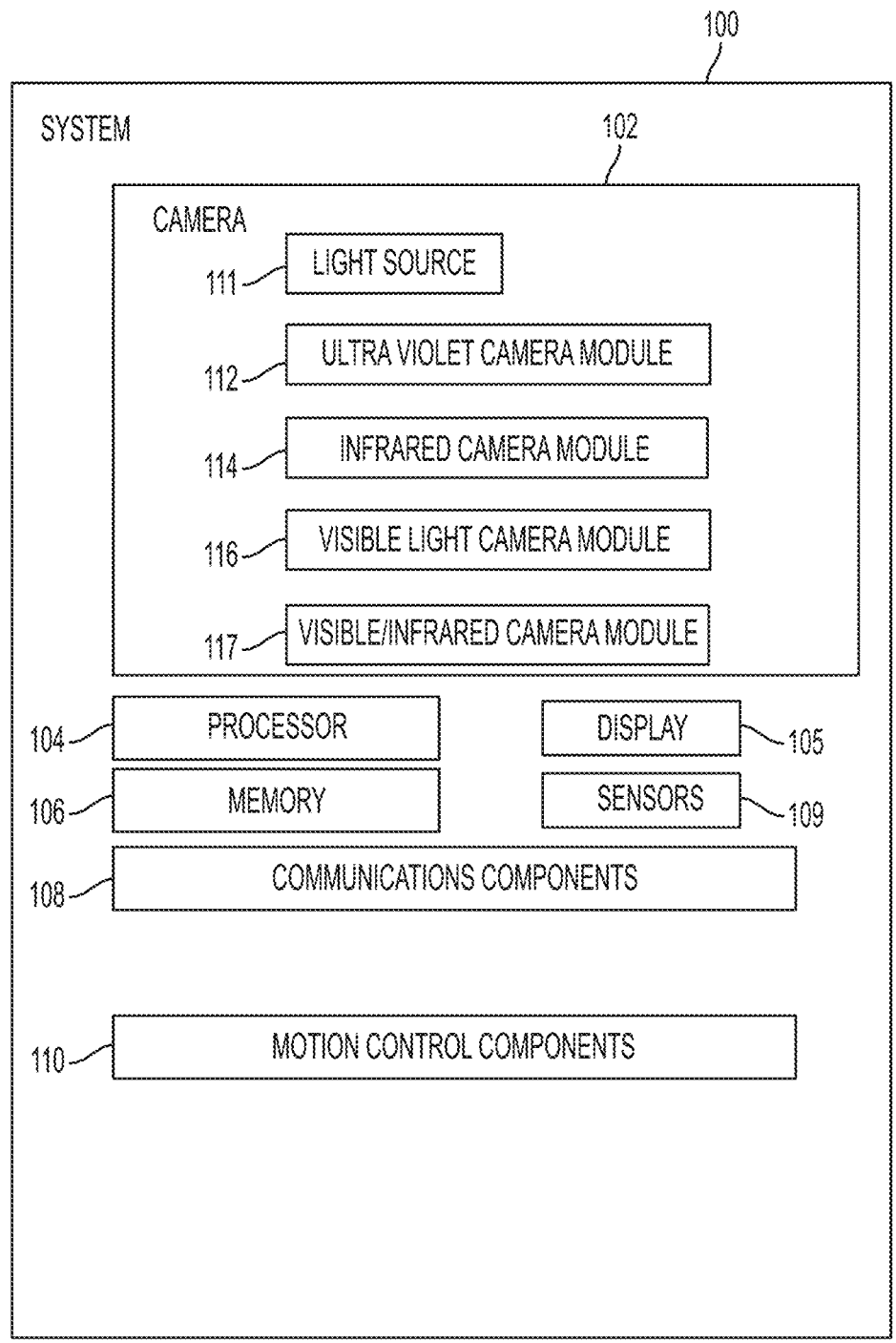
FIG. 1 shows an illustrative block diagram of an electrical equipment monitoring system in accordance with an embodiment.

Turning now to the drawings, FIG. 1 illustrates a block diagram of a system (e.g., an imaging system) for capturing and processing images in accordance with one or more embodiments. A system such as system 100 may include, in one implementation, an image capture component such as camera 102.

Camera 102 may include one or more camera modules, each configured to capture images in response to light in one or more corresponding wavelength bands. In the example of FIG. 1, camera 102 includes an ultraviolet (UV) camera module 112, an infrared camera module 114, a visible light camera module 116, and a combined visible/infrared camera module 117. Each of camera modules 112, 114, 116, and 117 may include optical elements arranged to guide, focus, filter and/or otherwise direct light onto one or more photosensitive components.

Ultraviolet camera module 112 may, for example, be a solar-blind UV camera module with a high sensitivity silicon imaging sensor such as an electron multiplied charge-coupled-device (CCD) sensor or a scientific complementary metal oxide semiconductor (sCMOS) sensor (as examples). The imaging sensor may be processed so as to have enhanced responsivity in a portion of the UV region of the electromagnetic spectrum such as the UVc band (e.g., between 100 and 280 nanometers) to reduce the solar background for daytime imaging, as well as the anthropogenic background of near-UV, visible and infrared wavelengths that contribute to the background seen by a silicon sensor.

The enhanced UVc quantum efficiency of UV camera module 112 can be implemented by using, in some embodiments, back-thinning processes, backside illumination arrangements, and/or coating the sensor with a wave-shifting coating such as Lumogen® coatings manufactured by BASF® or a composite phosphor coating such as Metachrome II® manufactured by Photometrics® that converts UVc wavelength light to visible wavelengths where the inherent quantum efficiency of a silicon sensor is higher. In one embodiment, the enhanced UVc quantum efficiency may be implemented by using a focal plane array (FPA) with high bandgap gallium nitride detectors. An FPA detector of this type may have a relatively greater quantum efficiency in, for example, the UVc band than even enhanced UV quantum efficiency silicon-based sensors (e.g., back-thinned, backside illuminated, and/or coated silicon-based sensors as described above), and may have the additional advantage of an inherent spectral selectivity to UV light due to the high bandgap energy.

An imaging sensor based on gallium nitride (GaN) detectors may, in some embodiments, include avalanche photodiode detectors to provide increased signal gain. In one embodiment, GaN detectors may be coupled to a relatively low noise readout integrated circuit (ROIC) (e.g., a ROIC having relatively small integration capacitors in comparison with conventional readout integrate circuits) that allows relatively high signal gain to be used without undesirably increasing readout noise. GaN detectors may be operated using an operating voltage that is relatively high compared to other types of focal plane arrays (e.g., InGaAs focal plane arrays) due to the relatively high bandgap energy of GaN detectors.

A high-sensitivity UV imaging sensor based on EMCCD, sCMOS or GaN detectors (as examples) may have a relatively high resolution in comparison with conventional corona detection imaging systems. A system such as system 100 with this type of high-resolution UV imaging sensor may provide the advantageous ability to use images such as UV images and/or UV images combined with other images (e.g., visible light images and/or infrared images) to distinguish between various types and/or causes of electrical anomalies. For example, a high resolution UV image may be used to distinguish between a partial discharge along a dirty insulator and a broken strand that is protruding from a cable in the high resolution image.

A sensor with high-sensitivity and/or high resolution in the UVc may also be combined with optical elements having suitable transmission and modulation transfer function (MTF) performance in the UVc band. The optical elements may be formed from materials such as fused silica (e.g., high-purity quartz), calcium fluorite, and/or other suitable materials.

UV camera 112 may also include a bandpass filter that transmits UVc radiation and rejects other wavelengths of light such as light having wavelengths longer than 290 nm. For example, UV camera 112 may include a bandpass filter that transmits UVc radiation with, for example, at least 10% or greater transmission at a center wavelength of, for example, 260 nm, a spectral width on the order of, for example, 30 nm, and a high out-of-band rejection ratio (e.g., the filter may transmit less than 1 part in between $10^6$ and $10^{12}$ of the solar background which, at sea level, is generally above 290 nm). Put another way, according to an embodiment, the filter may pass virtually no radiation with wavelengths longer than 290 nm, with, for example, less than 1 part per million (e.g., approximately one part per million, between one part per million and one part per $10^{12}$, less than one part in $10^{12}$, etc.) of that radiation passing through the filter, while transmitting radiation with wavelengths less than 290 nm with greater than, for example, 10% transmission so that corona events can be detected and bright solar sources such as direct sunlight or directly reflected sunlight from a shiny object can be excluded. This type of solar blocking filter may be placed between the lens and the sensor to minimize its size, and hence its cost.

Infrared (IR) camera module 114 may include any type of infrared camera adapted to detect infrared radiation and provide representative data and information (e.g., infrared image data of a scene). As examples, IR camera module 114 may represent an infrared camera, a dual band imager such as a night vision imager that operates to sense reflected visible, near infrared (NIR), and/or short-wave infrared (SWIR) light for high resolution images and/or mid-wave infrared (MWIR) light, and/or long-wave infrared (LWIR) radiation for thermal imaging, or an imager for sensing both short wave and long wave radiation simultaneously for providing independent image information.

IR camera module 114 may, in one embodiment, be a thermal imaging camera module that includes one or more image detector elements such as infrared photodetector elements (e.g., any type of multi-pixel infrared detector, such as a focal plane array) for capturing thermal image data such as infrared image data (e.g., still image data and/or video data) representative of an scene. IR camera module 114 may include an array of strained layer superlattice (SLS) detectors, uncooled detector elements (e.g., uncooled microbolometer sensors), cooled detector elements (e.g., detector elements such as photovoltaic or quantum structure elements that are cooled using a cryogen coupled to the array or using a refrigeration system), InSb detector elements, quantum structure detector elements, InGaAs detector elements, or other types of sensors.

Camera 102 may include an illumination source such as light source 111. Light source 111 may be used to generate visible and/or infrared light to illuminate a portion of a scene for imaging by IR camera module 114, visible light camera module 116, and/or visible/IR camera module 117. In some embodiments, a light source such as light source 111 may be incorporated into one or more of camera modules 114, 116, and/or 117.

Visible light camera module 116 may, in one embodiment, include one or more image detector elements such as charge-coupled device (CCD) detector elements, complementary metal oxide semiconductor (CMOS) detector elements, electron multiplying charge coupled device (EMCCD), scientific CMOS (sCMOS) or other types of visible light sensors.

Visible/IR camera module 117 (and in some embodiments, visible light camera module 116 and/or infrared imaging module 114) may include visible light and/or NIR imaging capabilities. For example, visible/IR camera module 117 may include one or more visible light sensors as described above in connection with visible light camera module 116 and one or more NIR imaging sensors, one or more NIR filters or other optical elements and, if desired, a near infrared illumination source operable to illuminate a scene to be imaged. In another example, visible/IR camera module may include a sensor having enhanced visible light imaging capabilities such as an EMCCD sensor that is operable to capture low light or night vision images in addition to images of brightly illuminated scenes. Visible light camera module 116 and/or visible/IR camera module 117 may be used to provide visual context to images captured using UV camera module 112 and/or IR camera module 116.

In one implementation, camera 102 may be configured to generate digital image data representing incoming image light of various wavelengths from a scene. Camera 102 may include one or more signal processing components such as analog-to-digital converters included as part of an image sensor or separate from the image sensor as part of system 100.

System 100 may include a processing component such as processor 104, a memory component such as memory 106, a display component such as display 105, communications circuitry such as communications components 108, sensors 109, and/or other circuitry or components (e.g., positioning components such as gyroscopes, accelerometers, compasses or global positioning system (GPS) circuitry, a battery, and/or other components).

System 100 may include one or more components for controlling the motion, position, and/or orientation of system 100 such as motion control components 110 (e.g., one or more motors, wheels, gears, propellers, rotors, wings, blades, or other mechanical or electrical components). For example, system 100 may be an unmanned aerial vehicle such as a helicopter drone that can be flown, using motion control components 110 along a power line system while camera 102 captures multi-wavelength images of the power line system and, if desired, transmits the multi-wavelength images to a remote system using communications components 108. According to various embodiments, motion control components 110 may be arranged to carry camera 102 between various portions of an electrical distribution system (e.g., along power lines) and/or reposition, pan, tilt, or otherwise move camera 102 with respect to electrical equipment for capturing images of the electrical equipment.

In various embodiments, processor 104 may include any type of a processor or a logic device (e.g., a programmable logic device (PLD) configured to perform processing functions). Processor 104 may be adapted to interface and communicate with components 102, 104, 105, 106, 108, 109, and/or 110 to perform processing and/or other operations for system 100.

Memory 106 may include, in one embodiment, one or more memory devices adapted to store data and information, including for example image data such as infrared data and information. Memory 106 may include one or more various types of memory devices including volatile and non-volatile memory devices. Processing component 104 may be adapted to execute software stored in memory 106 so as to perform method and process steps and/or operations described herein.

Display 105 may include, in one embodiment, an image display device (e.g., a liquid crystal display (LCD) or various other types of generally known video displays or monitors). However, this is merely illustrative. In some embodiments, system 100 may be provided without a display.

In various implementations, sensors 109 may provide information regarding the position, orientation, and/or motion of system 100. Sensors 109 may include one or more accelerometers that provide acceleration data for measuring the acceleration of system 100, one or more gyroscopes that provide gyroscope data for measuring the position and/or orientation and/or linear changes in the position and/or orientation of the system, global positioning system components that provide global positioning system (GPS) data for measuring the location of system 100, a compass that provides compass data for measuring the orientation of system 100, and/or other sensors. Sensors 109 may include an inertial measurement unit (IMU) (e.g., a packaged integrated circuit having one or more accelerometers, one or more gyroscopes, and/or one or more other sensors) that gathers position data, orientation data, and/or motion data and provides the gathered IMU data to a processor.

Processor 104 may receive sensor data from sensors 109 and, responsive to the received sensor data, operate motion control components 110 and/or camera 102. In various embodiments, components of system 100 may be combined and/or implemented or not, as desired or depending on the application or requirements, with system 100 representing various functional blocks of a related system.

Figure 2:
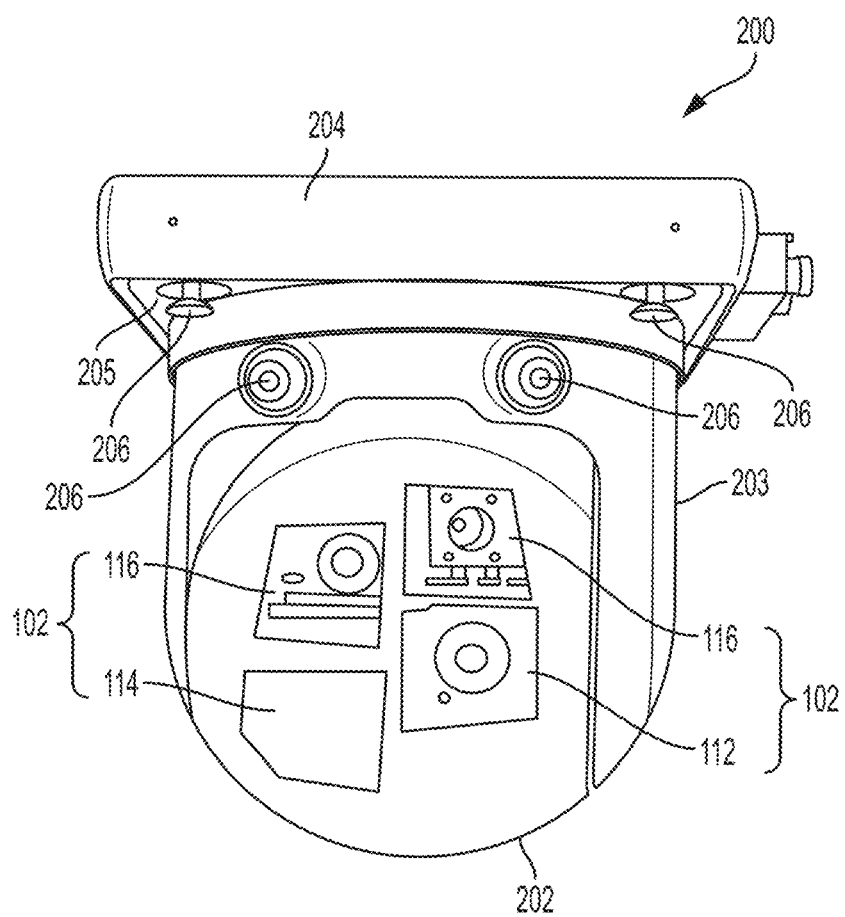
FIG. 2 shows an illustrative camera that may be used in the system of FIG. 1 in accordance with an embodiment.

Camera 102 may be implemented in a movable structure such as a gimbal or a pan-tilt that can be mounted to a structure such as a building or an electrical installation, a vehicle, an aircraft or other larger system or camera 102 may be implemented in a portable or handheld device. FIG. 2 shows an example of a gimbal incorporating camera 102. As shown in FIG. 2, a gimbal such as gimbal 200 may include one or more housing portions such as portions 202, 203, and 204. Portions 203 and 204 may be movable housing portions that can be moved or turned in order to adjust the field of view of one or more camera modules mounted in housing portion 202.

Camera modules 112, 114, and 116 of camera 102 may be mounted within housing portion 202. As shown in FIG. 2, housing portion 202 may include one or more openings within with camera modules may be mounted so that one or more camera modules receives light through each opening in housing portion 202. Housing portion 202 may be rotatably mounted with respect to housing portion 203 and housing portion 203 may be rotatably mounted with respect to fixed housing portions 204 and 205 so that camera 102 can be moved in one, two, three, or more degrees of freedom for imaging various portions of a surrounding environment.

In the example of FIG. 2, gimbal 200 includes four camera modules: an ultraviolet camera module 112 (e.g., a camera module that generates images in response to light having wavelengths between 240 nanometers (nm) and 300 nm according to an embodiment), an infrared camera module 114, and two visible light camera modules 116. However, this is merely illustrative. In various embodiments, a mounting structure such as a gimbal can include any desired number and combination of UV, IR, NIR, visible light, and/or visible/IR camera modules. For example, a system may be provided having a UV camera module, an IR camera module (e.g., a camera module that generates images in response to light having wavelengths between 7.5 microns and 12 microns according to an embodiment), and one visible light camera module, two visible light camera modules, a visible light camera module and a NIR camera module, a visible light camera module and a visible/IR camera module, two visible/IR camera modules or other combinations of UV, IR, NIR, and visible light imaging sensors or modules.

Each camera module may be arranged to have a common field of view with one or more other camera modules. For example, each of visible light camera modules 116 may be optically aligned with one or both of UV camera module 112 and IR camera module 114 so that images captured by the various camera modules can be combined (e.g., overlaid, fused, etc.) with images captured by other camera modules (e.g., for facilitating detection of anomalies in electrical equipment). However, this is merely illustrative. In some embodiments, camera modules may be included in gimbal 200 that have partially overlapping or non-overlapping fields of view with other camera modules.

Housing portion 203 may be secured to housing portion 204 via an interposing housing portion 205. Interposing housing portion 205 may be slidably coupled to housing portion 203 such that portion 203 can rotate with respect to portion 205. Portion 205 may be attached to housing portion 204 using, for example, fastening members 206 (e.g., screws, clips, fasteners, bolts, or the like) or other fastening media such as adhesive.

Housing portions 202, 203, 204, and 205 may be formed from a common material or from different respective materials. Materials that may be used for forming housing portions 202, 203, 204, and 205 may include metal, plastic, glass, ceramics, or other suitable materials.

Gimbal 200 or other mounting structures for camera 102 may be mounted via coupling member 204 to additional structures such as a utility pole, a vehicle (e.g., a manned or unmanned land-based or aerial vehicle such as a helicopter drone).

Figure 3:
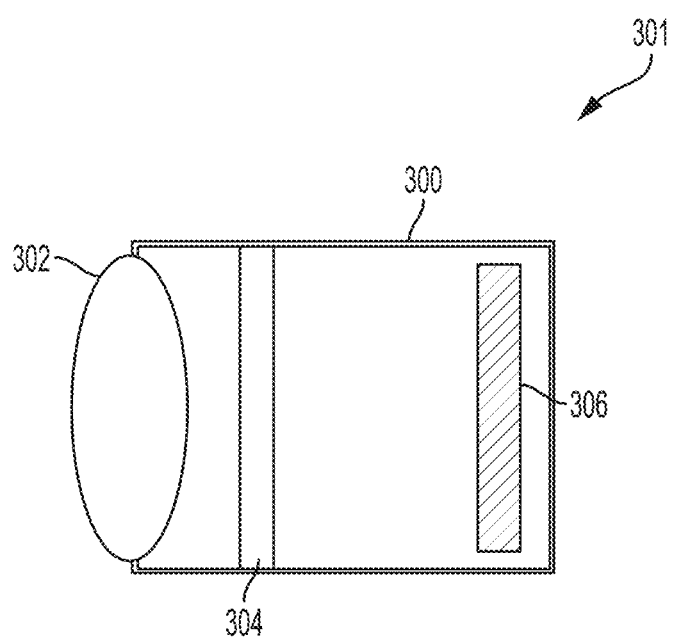
FIG. 3 shows a cross-sectional side view of an illustrative ultraviolet camera module in accordance with an embodiment.

FIG. 3 is a cross-sectional side view diagram of a camera module 301 having a lens 302, a filter 304, and a sensor 306 mounted within a housing 300. Lens 302 may focus incoming light through filter 304 onto sensor 306. In one example, housing 300 may be a housing of an ultraviolet camera module such as UV camera module 112 of, for example, FIGS. 1 and/or 2. In this example, lens 302 and filter 304 may cooperate to provide a suitable transmission and modulation transfer function (MTF) performance in, for example, the UVc band. For example, filter 304 may be a UV bandpass filter that passes UV light (e.g., light having wavelengths within the UV portion of the ultraviolet spectrum such as UVc light) and blocks other wavelengths of light and/or lens 302 may be a lens that passes UV light such as a fused silica lens (e.g., a lens formed from quartz), a calcium fluorite lens, or a lens formed from other DV transmissive materials.

In the example of a UV camera module configuration for camera module 301, sensor 306 may, according to various embodiments, be a UV-sensitive sensor such as a back-thinned EMCCD, sCMOS or other sensor having shortwave UV response and, in some embodiments, high gain. In some embodiments, sensor 306 may be implemented as a focal plane array (FPA) with, for example, high bandgap gallium nitride detectors. In embodiments in which sensor 306 is implemented as a focal plane array (FPA) with high bandgap gallium nitride detectors, sensor 306 may be provided with avalanche photodiode detectors, a relatively high operating voltage, and/or a low noise ROIC as described herein.

Figure 4:
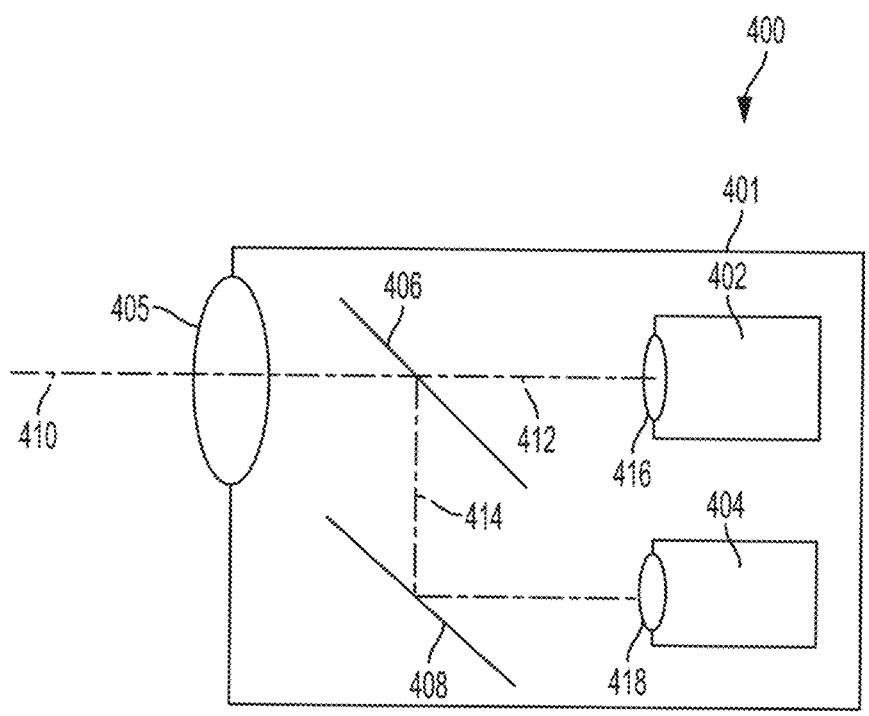
FIG. 4 shows a diagram of an illustrative ultraviolet camera module having multiple imaging sensors in accordance with an embodiment.

In some embodiments, one or more camera modules may include multiple sensors that receive light through multiple corresponding lenses or through a common lens (and, for example, additional optical components). FIG. 4 shows a diagram of a camera module having multiple sensors.

As shown in FIG. 4, a camera module such as camera module 400 may include a housing such as housing 401 and a lens such as lens 405 that allows light to pass through the lens and into the housing along an optical path such as optical path 410. Camera module 400 may include multiple sensors such as sensors 402 and 404. In various embodiments, sensors 402 and 404 may be sensitive to light in a common wavelength band or light different wavelength bands. In one suitable example, sensor 402 may be a UV sensor (e.g., a sensor that generates images in response to light having wavelengths between 240 nm and 300 nm according to an embodiment) and sensor 404 may be a visible light sensor (e.g., a sensor such as a CCD or a CMOS sensor that generates images in response to light having wavelengths between 380 nm and 780 nm according to an embodiment).

Camera module 400 may include one or more optical elements such as beam splitter 406 and mirror 408. Beam splitter 406 may pass a portion of the light that passes through lens 405 along optical path 410 such that the portion of the light that passes through beam splitter 406 continues along an optical path 412 to sensor 402. Beam splitter 406 may reflect another portion of the light that passes through lens 405 along optical path 410 onto a reflected optical path such as optical path 414 such that the reflected portion of the light that has passed through lens 405 reflects from mirror 408 and onto sensor 404.

In this way, sensors 402 and 404 may receive light from a common portion of a scene to facilitate generation of combined ultraviolet and visible light images that allow detection of corona events by the UV images and location of the corona event by the visible light images. However, this is merely illustrative. In various embodiments, images generated in response to light of any suitable wavelengths (e.g., UV, IR, NIR, and/or visible light wavelengths) can be captured using multiple sensors in a common camera module and/or multiple sensors in different camera modules.

As shown in FIG. 4, a camera module may include additional optical elements such as lenses 416 and 418 adjacent to sensors 402 and 404 for further focusing, filtering, redirecting, or otherwise processing light to be captured in an image using sensors 402 and 404.

Images generated in response to light of any suitable wavelengths (e.g., UV, IR, and/or visible light wavelengths) captured by any suitable combination of camera modules and sensors can be combined in various image combination processes. Images such as IR images (e.g., thermal images, long wavelength infrared (LWIR) images, medium wavelength infrared (MWIR) images, short wavelength infrared (SWIR) images, or near-infrared (NIR) images), visible light images, and/or UV images and/or combined images such as combined UV and visible light images, combined UV and IR images, combined IR and visible light images, and/or combined UV, IR, and visible light images can be used to automatically and/or manually detect various physical phenomena such as malfunctioning electrical equipment. For example, according to various embodiments, a processor or a human inspector may examine one or more images and determine an anomaly in an electrical system based on the images (e.g., images from an ultraviolet camera module, an infrared camera module, a visible light camera module, a NIR camera module and/or a visible/IR camera module). FIGS. 5, 6, 7, 8, and 9 show various examples of images that can be captured by a camera such as camera 102 of system 100 and used to detect various electrical equipment malfunctions.

Figure 5:
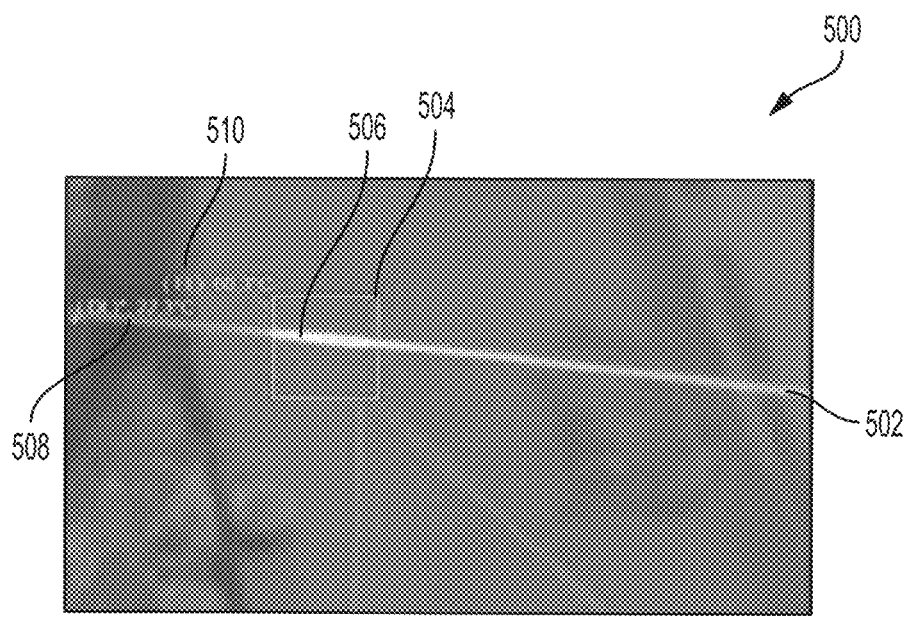
FIG. 5 shows an illustrative infrared image of a hot spot on a power line in accordance with an embodiment.

FIG. 5 shows an example of an IR image of a portion of a power line 502 such as a high voltage electrical transmission line. In the example of FIG. 5, IR image 500 includes a portion 506 that indicates that a corresponding portion of the power line has a temperature that is higher than other portions of the power line (e.g., the power line has a potentially dangerous hot spot as identified by IR image 500). An image such as IR image 500 may be captured during a power line inspection mission as, for example, an unmanned or manned aircraft or land-based vehicle travels along the power line (e.g., potentially along large distances such miles, tens of miles, hundreds of miles, or thousands of miles) and may be transmitted to an operator or may be automatically analyzed to detect a hot spot or other electrical malfunction.

As shown in FIG. 5, IR image 500 may be processed to include enhanced features such as box 504 that surrounds a portion of an image that suggests a potential problem such as the hot spot and/or temperature information 508 and/or 510 that indicates the average temperature of the power line, the temperature of the hot spot, the difference in temperature between the hot spot and other portions of the power line or other temperature information (as examples).

Figure 6:
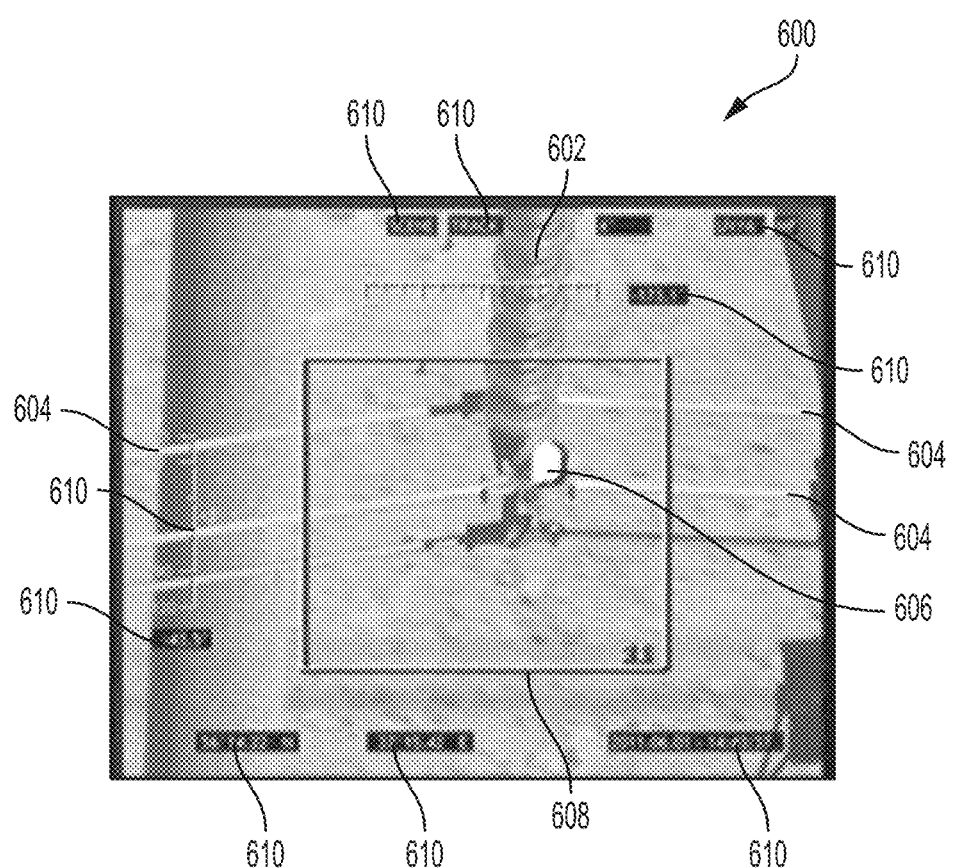
FIG. 6 shows an illustrative combined visible and ultraviolet image of a corona discharge at the junction of a power line and a utility pole insulator in accordance with an embodiment.

FIG. 6 shows an example of a combined visible and UV image of a junction between one or more power lines 604 and a utility pole insulator 602. In the example of FIG. 6, combined visible and UV image 600 includes a bright UV portion 606 that indicates relatively intense UV radiation at the junction (e.g., a corona discharge at the junction as identified by UV image 600). An image such as image 600 (e.g., a combined visible and solar-blind UV image) may be captured during a power line inspection mission and may be transmitted to an operator or may be automatically analyzed to detect a corona discharge, corona failure, or other electrical malfunction.

As shown in FIG. 6, combined visible and UV image 600 may be processed to include enhanced features such as box 608 that surrounds a portion of image 600 and indicates a potential problem such as the corona discharge and/or additional information 610 such as geographical coordinates (e.g., a longitude and a latitude of the junction), camera and/or system operation information, a date and/or time stamp of the image, a waveband (e.g., UVa, UVb, UVc, etc.) of the image, camera position information (e.g., a camera tilt angle), an image scale indicator, inspection route information (e.g., GPS coordinates at which inspection images have been captured), inspector information (e.g., identifying information of a human operator and/or identifying information of a monitoring system), equipment identifying information (e.g., a unique identifier such as a number of a particular utility pole, insulator, junction, switchgear, or other equipment), or other information associated with the image, the junction, and/or the system. Additional information of this type may also be provided with one or more other images such as infrared images, visible light images, near infrared images and/or combined images.

A system such as system 100 may provide a user with the ability to selectively combine images such as a UV image and a visible light image to form a combined image such as combined visible and UV image 600. For example, visible and UV image 600 may be formed by overlaying or otherwise adding one or more portions of a UV image onto a visible light image with a selective transparency level that allows the user to increase or decrease the relative transparency of the UV image portions through which the visible light image can be viewed according to an embodiment. In general, images such as UV, IR, and visible light images can be combined in any suitable manner for facilitating detection of electrical anomalies.

Figure 7:
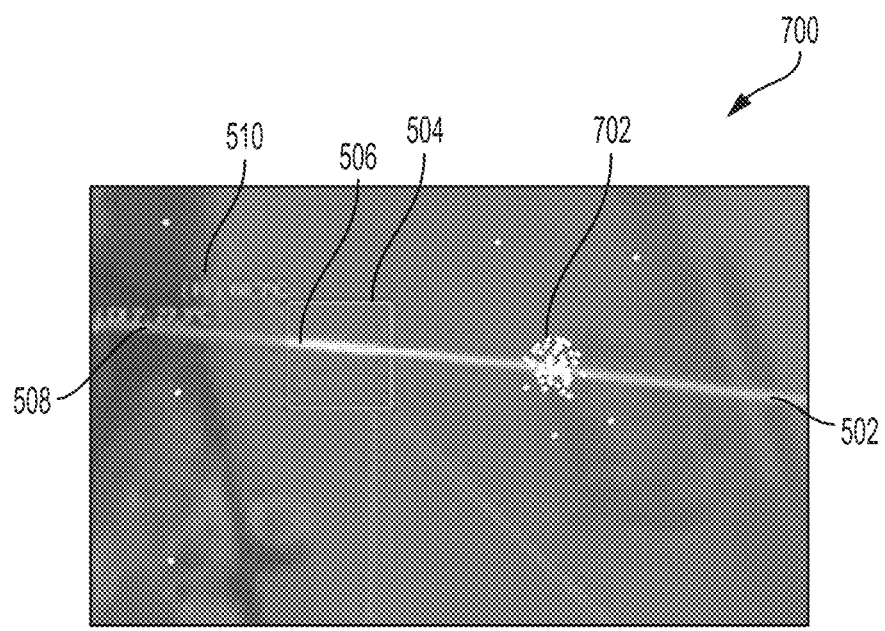
FIG. 7 shows an illustrative combined infrared and ultraviolet image of a hot spot on a power line and a corona failure on the power line in accordance with an embodiment.

FIG. 7 shows an example of a combined IR and UV image 700 of a portion of power line 502 showing how combined UV and IR image 700 may include a bright IR portion 506 that indicates that a corresponding portion of the power line has a temperature that is higher than other portions of the power line (e.g., the power line has a potentially dangerous hot spot as identified by combined UV and IR image 700) and one or more bright UV portions such as cluster of bright spots 702 that indicate, for example, a corona failure on the power line. An image such as combined UV and IR image 700 may be captured during a power line inspection mission and may be transmitted to an operator or may be automatically analyzed to detect a hot spot and/or corona event or other electrical malfunction.

A system such as system 100 may provide a user with the ability to selectively combine images such as a UV image and an IR image to form a combined image such as combined UV and IR image 700. For example, UV and IR image 700 may be formed by overlaying or otherwise adding one or more portions of a UV image onto an IR image with a selective transparency level that allows the user to increase or decrease the relative transparency of the UV image portions through which the IR image can be viewed according to an embodiment.

Figure 8:
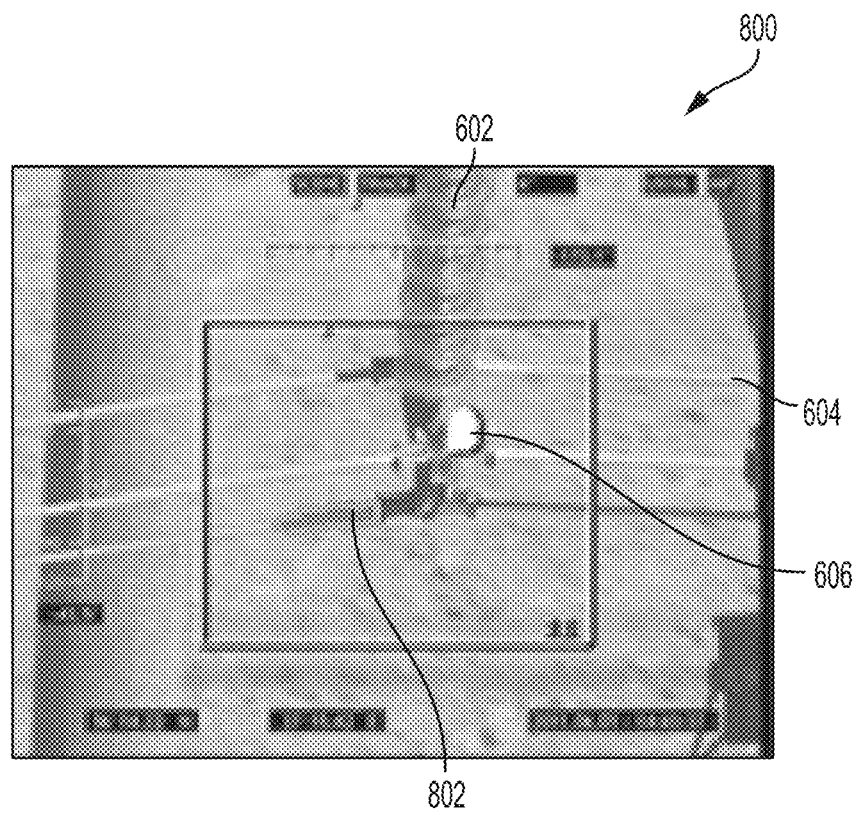
FIG. 8 shows an illustrative combined visible, infrared, and ultraviolet image of a corona discharge and a hot spot at the junction of a power line and a utility pole insulator in accordance with an embodiment.

FIG. 8 shows an example of a combined visible, IR, and UV image 800 of a junction between one or more power lines 604 and a utility pole insulator 602 showing how combined visible, UV, and IR image 800 may be formed by overlaying or otherwise adding a portion of an IR image and a portion of a UV image to a visible light image. As shown in FIG. 8, visible, UV, and IR image 800 may include a bright IR portion 802 that indicates that a corresponding portion of the power line or junction has a temperature that is higher than other portions of the power line (e.g., the power line has a potentially dangerous hot spot as identified by combined image 800) and one or more bright UV portions such as portion 606 that indicate, for example, a corona discharge at the junction. An image such as combined visible, UV, and IR image 800 may be captured during a power line inspection mission and may be transmitted to an operator or may be automatically analyzed to detect a hot spot and/or corona event or other electrical malfunction.

The portion of the IR image that is added to the visible image may be selected (e.g., manually or automatically by a processor) based on a comparison of the infrared image to one or more thresholds. For example, the selected portion of the IR image may be a portion of the IR image having a brightness that exceeds a lower brightness threshold such as a lower percentage brightness threshold or a lower absolute brightness threshold (as examples). As another example, the selected portion of the IR image may be a portion having a brightness that corresponds to a temperature that differs from temperatures of other portions of the IR image by an amount that exceeds a temperature difference threshold.

The IR image brightness may optionally be compared to an upper brightness threshold. Portions of the IR image that exceed the upper threshold may be determined to be caused by non-thermal emission such as bright reflected light such as a sun glint reflecting from a shiny (e.g., metal) object and may therefore be excluded from being added to a combined image or used to detect an electrical anomaly. An upper brightness threshold comparison may be particularly useful for excluding erroneous detections of electrical anomalies in MWIR images, but may be used for any suitable images such as SWIR, NIR, and/or LWIR images (as examples).

Visible, UV, and IR image 800 may be formed by overlaying or otherwise adding one or more selected portions of an IR image and one or more portions of a UV image with a selective transparency level that allows the user to increase or decrease the relative transparency of the IR image portions and/or UV image portions through which the visible light image can be viewed according to an embodiment.

Figure 9:
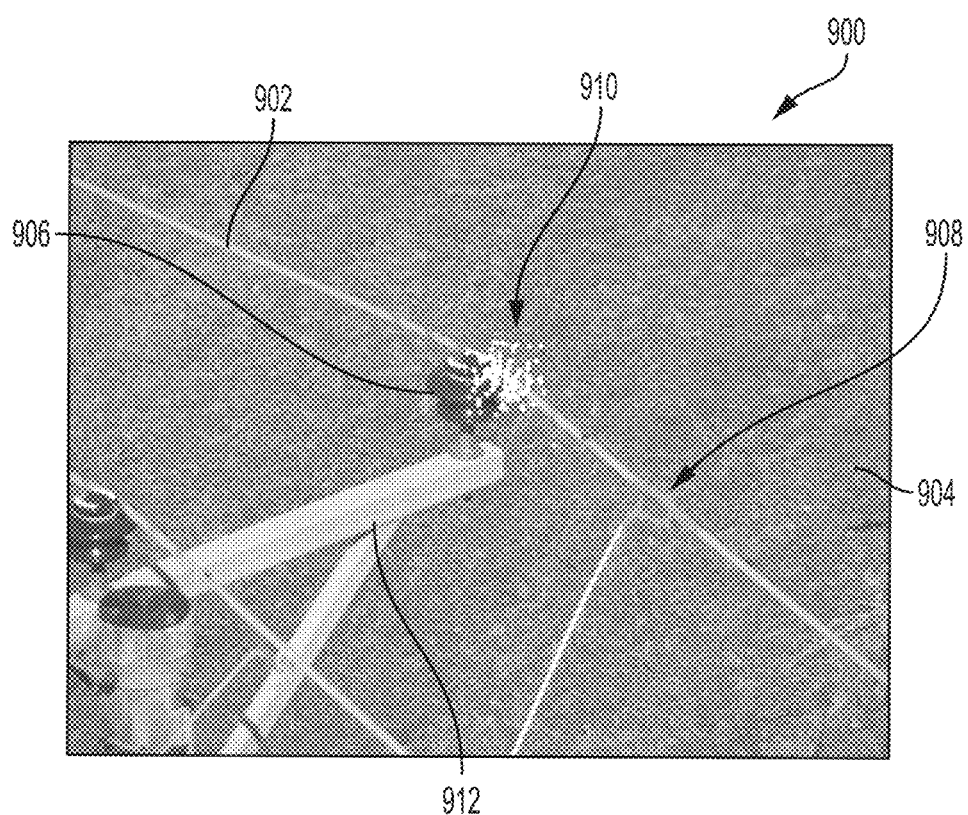
FIG. 9 shows an illustrative combined visible, infrared, and ultraviolet image of a hot spot on a power line and a corona failure the junction of a power line and a utility pole insulator in accordance with an embodiment.

FIG. 9 shows an example of a combined visible, IR, and UV image 900 of a junction between a power line 902 and a utility pole insulator 906 on a utility pole structure 912. In the example of FIG. 9, combined UV/IR/vis image 900 includes bright UV portions 910 that indicate relatively intense UV radiation at the junction (e.g., a corona failure at the junction as identified by combined UV/IR/vis image 900), a portion 908 that indicates that a corresponding portion of the power line has a temperature that is higher than other portions of the power line (e.g., the power line has a potentially dangerous hot spot as identified by combined UV/IR/vis image 900), and visually recognizable features such as background objects such as a portion of the ground 904 or other objects such as power line 902 and utility pole 912. Visually recognizable features in a combined image such as image 600, image 800 or image 900 may be more easily recognizable to an operator due to the inclusion of some or all of the visible light image in the combined image. An image such as combined UV/IR/vis image 900 may be captured during a power line inspection mission and may be transmitted to an operator or may be automatically analyzed to detect a corona discharge, corona failure, or other electrical malfunction.

UV, IR, and visible light image 900 may be formed by overlaying or otherwise adding one or more portions of an IR image and one or more portions of a UV image (e.g., each with a selective transparency level) onto a visible light image. In this way, a user of a system such as system 100 may be provided with an enhanced ability to identify and locate potentially dangerous problems and thereby prevent potentially harmful equipment failures. In some embodiments, a UV image based on light having wavelengths in the range of (for example) 240 nm-300 nm may be combined, fused, and/or mixed with any other image generated in response to light having wavelengths in one or more ranges between 380 nm and 12.5 microns (for example) in several different combinations. In some embodiments, images from more than three sensors can be used and combined at the same time. Combined wavelength images of the type described herein may also be used in other environments and situations such as to detect a muzzle flash.

Figure 10:
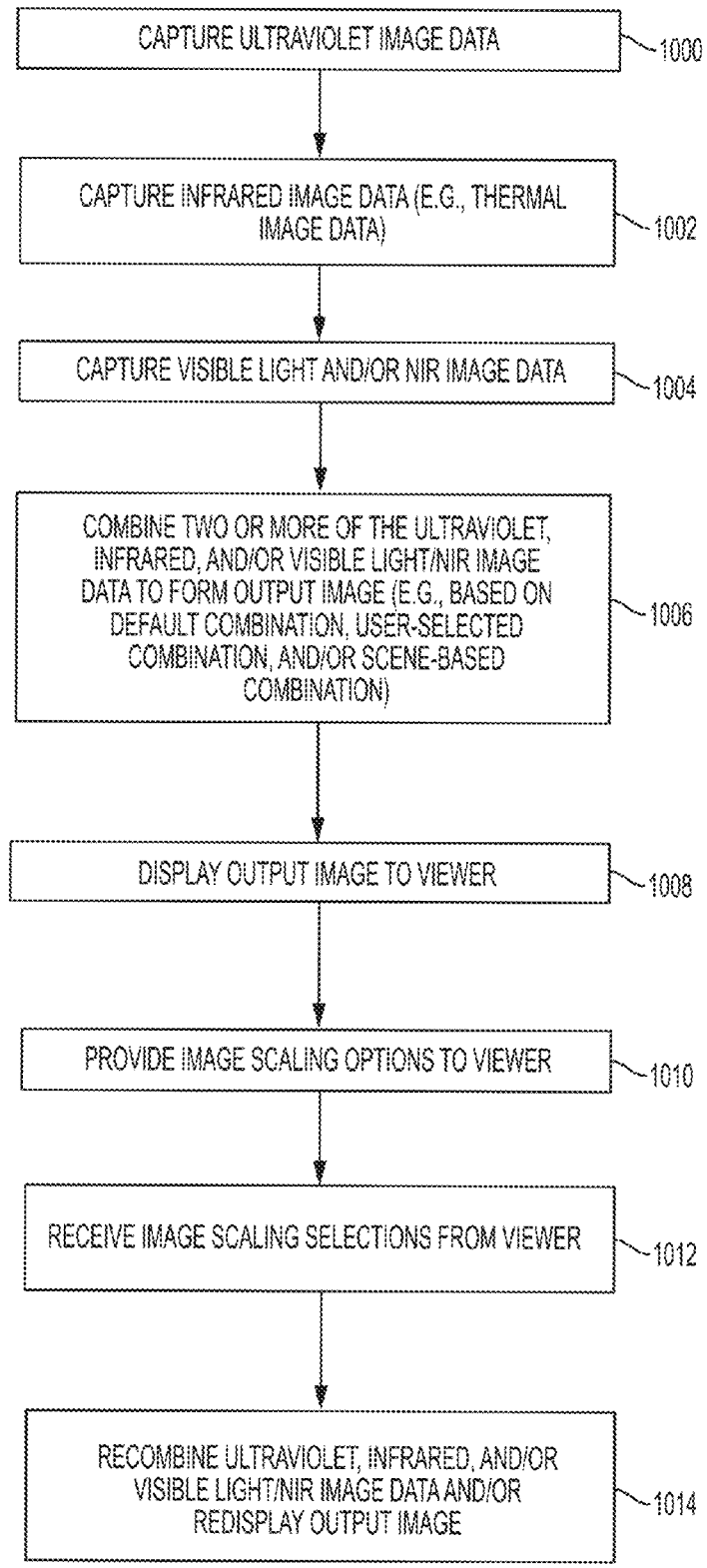
FIG. 10 shows a flowchart of an illustrative process for combining ultraviolet, infrared, and/or visible light images for electrical equipment monitoring in accordance with an embodiment.

FIG. 10 illustrates a flow chart of an exemplary process for capturing and combining multi-wavelength image data.

At block 1000, image data corresponding to a first wavelength range such as ultraviolet image data may be captured (e.g., using one or more UV camera modules). The ultraviolet image data may be captured using an ultraviolet light imaging module such as a solar-blind ultraviolet light imaging module having a bandpass filter that blocks solar ultraviolet light.

At block 1002, image data corresponding to a second wavelength range such as infrared image data may be captured (e.g., using one or more IR camera modules such as thermal imaging camera modules).

At block 1004, image data corresponding to a third wavelength range such as visible light image data and/or NIR image data may be captured. The image data corresponding to the third wavelength range may be captured using one or more camera modules that are sensitive to visible light and/or NIR light (e.g., one or more visible light camera modules and/or one or more visible light/IR camera modules).

At block 1006, image data corresponding to two or more of the wavelength ranges such as two or more of the ultraviolet, infrared, visible light, and/or NIR image data may be combined to form an output image such as a combined image (e.g., a UV and IR image, a UV and visible light image, an IR and visible light image, and/or a UV/IR/vis image) as described herein (for example). Combining the image data may include combining the image data based on a default combination process, a user-selected combination process, and/or a scene-based combination process according to various embodiments. Combining the image data may include overlaying image data, fusing the image data or otherwise combining the image data according to various embodiments.

Fusing the image data may include combining a first image (e.g., an ultraviolet image or a thermal IR image) with the high spatial frequency content of a second image (e.g., a visual and/or NIR image) to yield a combined image. The combination can be performed through superimposition of the high spatial frequency content of the second image and the first image, or alternatively superimposing the first image on the high spatial frequency content of the second image. As a result, contrasts from the second image can be inserted into the second image showing temperature variations or corona events, thereby combining the advantages of the two image types without losing clarity and interpretability of the resulting combined image.

Both images may originally have substantially the same resolution, or the resolution of the images may differ. Since the resolution of an IR image or a UV image can be lower than that of a visual or NIR image, due to properties of IR and UV imaging devices compared to visual and NIR imaging devices, the resolution of the first image may be up-sampled to be substantially the same as the resolution of the visual image or the second image can be down-sampled to be substantially the same as the resolution of the first image, as examples. In a further example, both images can be resampled to fit a third resolution, if suitable. In one example, the third resolution can be that of a display screen where the combined image is to be displayed.

Additionally, extraction of high spatial frequency content in the visual image and de-noising and/or blurring of the IR image, or a portion of the IR image, may be performed. These operations may be achieved by high pass filtering the second image and low pass filtering the first image, or a portion of the first image, by use of spatial filters that are moved across the images, pixel by pixel. It is evident to a person skilled in the art that other well-known image processing methods may be used to render the same result. As a result of the filtering performed on the first image, or the portion of the first image, the first image, or the portion of the first image, can be rendered smooth and/or contain a reduced amount of noise compared to the original first image. Additionally, the high spatial frequency content extracted from the second image contains information on large contrasts in the second image, i.e. information on where sharp edges such as object contours are located in the second image. The operations of performing filtering of the first image are optional.

Besides high pass filtering, examples of methods for extracting high spatial frequency content in an image may include extracting the difference (commonly referred to as a difference image) between two images depicting the same scene, where a first image frame is captured at one time instance and a second image frame is captured at a second time instance, preferably close in time to the first time instance. The two image frames may typically be two consecutive image frames in an image frame sequence. High spatial frequency content, representing edges and contours of the objects in the scene, may appear in the difference image. Additional details of image fusion processes are described in U.S. Patent Publication No. 2014/0015982 filed Apr. 2, 2012 which is incorporated herein by reference in its entirety.

A default image combination process may include combining the image data based on a predetermined selection of image data from various ones of the images, a predetermined combination algorithm, and/or a predetermined selection of a transparency of image data of one wavelength range with respect to image data of another wavelength range. A user-selected image combination process may include combining the image data based on a user-selected portion of image data from various ones of the images, a user-selected combination algorithm, and/or a user-selected transparency of image data of one wavelength range with respect to image data of another wavelength range. A scene-based image combination process may include combining the image data based on a selection of image data from various ones of the images as determined based on contents (e.g., the intensity, contrast, detected objects or anomalies, or other properties) of the captured image data, and/or a selection of a transparency of image data of one wavelength range with respect to image data of another wavelength range based on the contents of the captured image data.

For example, in a situation in which no anomalous UV signal is detected in a UV image and anomalous IR signals are detected in an IR image, a combined image may include only visible light and IR image data or only IR image data. As another example, in a situation in which no anomalous IR signal is detected in an IR image and anomalous UV signals are detected in an UV image, a combined image may include only visible light and UV image data or only UV image data. As another example, in a situation in which anomalous IR signals are detected in an IR image and anomalous UV signals are detected in a UV image, a combined image may include visible light, IR and UV image data or only UV and IR image data.

At block 1008, the output image may be displayed to a viewer (e.g., a local viewer or a remote viewer) such as a human operator, inspector, or monitor. Additional information may also be provided to the viewer such as inspector information, equipment identifying information, location information, temperature information and/or other information associated with the images, the system used to capture the images, the content of the images, and/or an inspector associated with the images. In one embodiment, one or more of the images may include an image of a unique equipment identifier such as a numerical identifier and/or a coded identifier (e.g., a bar code) that identifies a particular object in the image. A processor associated with the imaging system and/or a system of a remote viewer may extract equipment information such as a location of a potentially problematic piece of equipment from the captured image of the bar code (e.g., by determining a numerical or alphanumeric identifier of the equipment from the bar code and accessing stored information associated with the identifier from a database).

At block 1010, one or more image scaling options such as transparency, contrast, zoom, focus, and/or combination options may be provided to the user for adjusting the output image.

At block 1012, one or more image scaling selections selected by the viewer from the provided image scaling options may be received from the viewer.

At block 1014, image data corresponding to one, two or more of the wavelength ranges such as, one, two or more of the ultraviolet, infrared, and visible light image data may be recombined and/or the output image may be redisplayed according to the received image scaling selections from the user. For example, a user may increase or decrease the transparency of UV and/or IR data in a combined UV/IR/vis image to allow the user to identify and determine the location of an electrical anomaly as determined from the combined image.

Figure 11:
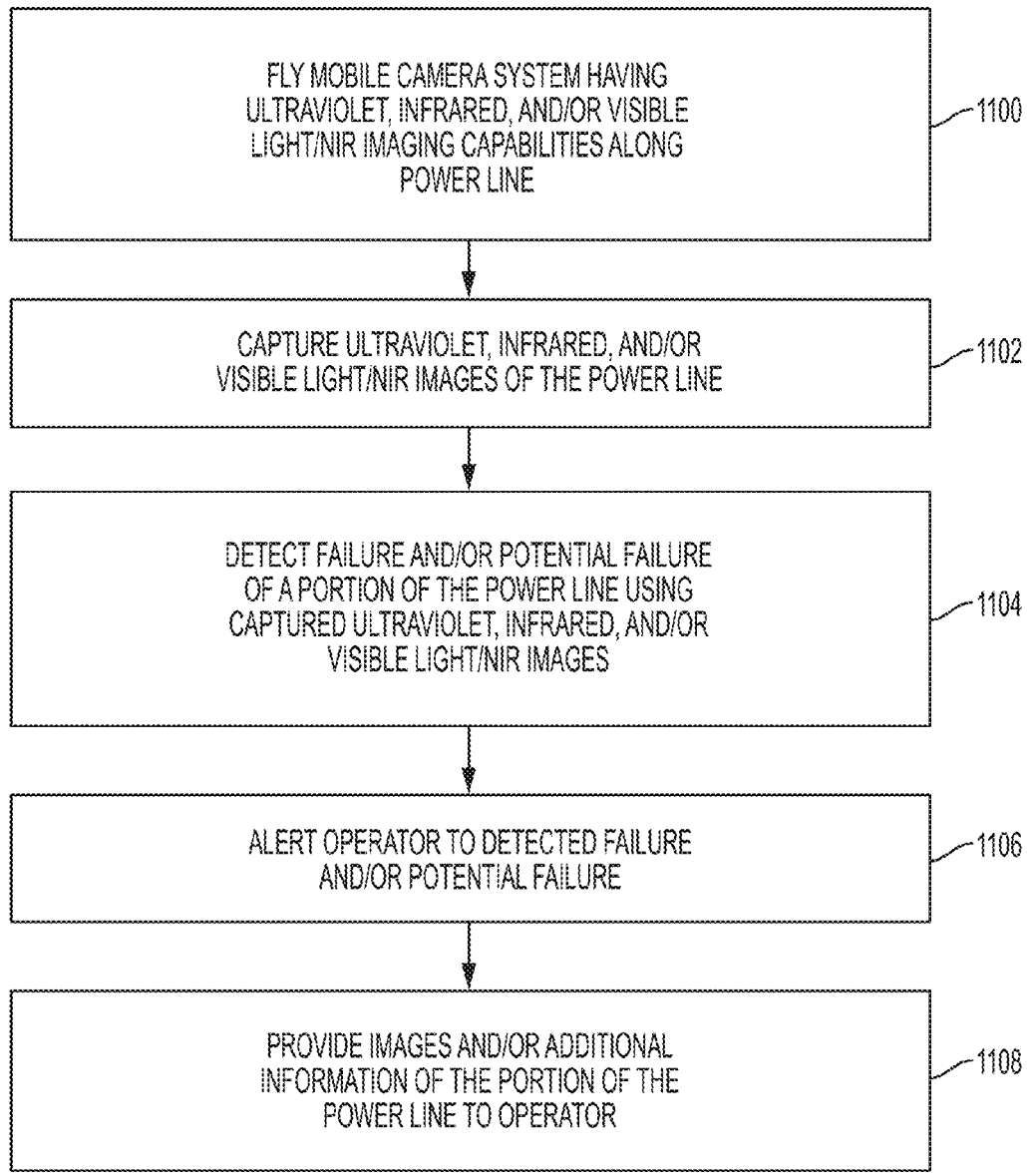
FIG. 11 shows a flowchart of an illustrative process for monitoring electrical equipment using a system having a multi-wavelength camera in accordance with an embodiment.

FIG. 11 illustrates a flow chart of an exemplary process for using a multi-wavelength imaging system to monitor electrical equipment.

At block 1100, a multi-wavelength imaging system such as a mobile camera system having ultraviolet, infrared, and visible light/NIR imaging capabilities may be guided (e.g., flown) to or along a portion of an electrical system such as along a power line such as a high voltage transmission line.

At block 1102, multi-wavelength images such as ultraviolet, infrared and/or visible light/NIR images may be captured of the electrical equipment (e.g., the power line).

At block 1104, a failure and/or a potential failure of some or all of the electrical equipment (e.g., a portion of the power line) may be detected using the captured ultraviolet, infrared and/or visible light/NIR images (e.g., individual or combined images).

At block 1106, an operator such as a human operator or monitor may be alerted to the detected failure and/or potential failure. Alerting the operator may include transmitting images and/or additional information from the mobile camera system at block 1108 and/or other alert activities such as providing control of the mobile camera system to the operator, activating an audible or visible alarm or otherwise notifying the operator of the detected failure and/or potential failure. The intensity and/or mode of alerting the operator may depend on a determined severity of the detected failure and/or potential failure. The additional information may include, as examples, geographical coordinates (e.g., a longitude and a latitude of the junction), camera and/or system operation information, a date and/or time stamp of the image, a waveband (e.g., UVa, UVb, UVc, etc.) of the image, camera position information (e.g., a camera tilt angle), an image scale indicator, inspection route information (e.g., GPS coordinates at which inspection images have been captured), inspector information (e.g., identifying information of a human operator and/or identifying information of a monitoring system), equipment identifying information (e.g., a unique identifier such as a number of a particular utility pole, insulator, junction, switchgear, or other equipment), or other information associated with the image, the junction, and/or the system.

The systems and methods disclosed herein may provide an enhanced ability to monitor and/or inspect equipment such as electrical equipment, particularly in remote and/or automatic monitoring and/or inspection operations.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A system comprising:
a solar-blind ultraviolet light imaging sensor configured to capture ultraviolet image data of at least a portion of electrical equipment;
an infrared light imaging sensor configured to capture infrared image data of at least the same portion of the electrical equipment;
a memory configured to store the ultraviolet image data and the infrared image data;
a processor in communication with the memory and configured to:
receive the ultraviolet image data and the infrared image data from the memory;
combine, by the processor, the ultraviolet image data and the infrared image data to generate combined image data; and
detect, by the processor, at least one of a corona discharge, a corona failure, or a temperature anomaly associated with the electrical equipment using the combined image data; and
wherein the memory is configured to store the combined image data.

2. The system of claim 1, further comprising:
a third imaging sensor configured to capture third image data in response to visible and/or near infrared light, wherein the processor is further configured to combine the third image data, the ultraviolet image data and the infrared image data to generate a second combined image data and detect the at least one of the corona discharge, the corona failure, or the temperature anomaly using at least the second combined image data, wherein the temperature anomaly comprises a temperature associated with an intensity value of a pixel of the least one of the combined image data and the second combined image data that exceeds a temperature threshold value.

3. The system of claim 2, wherein the processor is further configured to combine the third image data with the ultraviolet image data and the infrared image data at least in part by extracting high spatial frequency content from the third image data and combining the high spatial frequency content with the ultraviolet image data and the infrared image data to generate the second combined image data and detect the at least one of the corona discharge, the corona failure, or the temperature anomaly using at least the third combined image data.

4. The system of claim 1, wherein the solar-blind ultraviolet light imaging sensor comprises:
an ultraviolet light transmissive lens;
the sensor having an enhanced ultraviolet quantum efficiency; and
an ultraviolet bandpass filter interposed between the ultraviolet light transmissive lens and the sensor, wherein the ultraviolet bandpass filter is configured to block light having wavelengths longer than 290 nanometers and to pass light having wavelengths shorter than 290 nanometers.

5. The system of claim 1, further comprising a display, wherein the display is in communication with the processor and configured to display at least one of the ultraviolet image data, the infrared image data, or the combined image data, and wherein the processor is further configured to extract identifying information of the electrical equipment from at least one of the ultraviolet image data, the infrared image data, or the combined image data.

6. The system of claim 1, further comprising an unmanned vehicle coupled to the solar-blind ultraviolet light imaging sensor, the infrared light imaging sensor, the memory, and the processor and configured to transport the imaging sensors, the memory, and the processor to the electrical equipment.

7. The system of claim 6, wherein the unmanned vehicle is a helicopter drone.

8. A monitoring system, comprising:
a motion control component;
a camera comprising:
 a first imaging sensor comprising a solar-blind ultraviolet light imaging sensor configured to capture ultraviolet image data of an electrical distribution system to be monitored,
 a second imaging sensor comprising an infrared light imaging sensor configured to capture infrared image data of the electrical distribution system, and
 a third imaging sensor comprising a visible light imaging sensor configured to capture a visible light image data of the electrical distribution system;
a memory configured to store the ultraviolet image data, the infrared image data, and the visible light image data;
a processor in communication with the memory and configured to:
 receive the ultraviolet image data, the infrared image data, and the visible light image data from the memory;
 combine, by the processor, image data from at least two of the imaging sensors to generate combined image data; and
 detect, by the processor, at least one of an anomaly comprising a corona discharge, a corona failure, or a temperature anomaly associated with the electrical distribution system using at least the combined image data; and
wherein the motion control component is configured to carry the camera between various portions of the electrical distribution system.

9. The monitoring system of claim 8, wherein the processor is further configured to overlay a portion of the infrared image data on the ultraviolet image data or the visible light image data to generate a second combined image data and detect at least one of the anomalies associated with the electrical distribution system using at least the second combined image data, and wherein the temperature anomaly comprises a temperature associated with an intensity value of a pixel of at least one of the combined image data and the second combined image data that exceeds a temperature threshold value.

10. The monitoring system of claim 9, wherein the processor is configured to select the portion of the infrared image data based on a comparison of the infrared image data to one or more brightness threshold values.

11. The monitoring system of claim 8, further comprising a display, wherein the display is in communication with the processor and configured to display at least one of the ultraviolet image data, the infrared image data, the visible light image data, or the combined image data, and wherein the processor is further configured to overlay a portion of the ultraviolet image data on the infrared image data or the visible light image data to generate a third combined image data for detecting at least one of the anomalies associated with the electrical distribution system, and wherein the first imaging sensor comprises an electron multiplied charge-coupled-device sensor, a scientific complementary metal oxide semiconductor sensor, or a focal plane array having gallium nitride detectors.

12. The monitoring system of claim 11, wherein the portion of the ultraviolet image data has a selectable transparency, wherein a transparency level of the portion of the ultraviolet image data is selectively increased or decreased.

13. The monitoring system of claim 8, wherein the processor is further configured to overlay a portion of the infrared image data and a portion of the ultraviolet image data on the visible light image data to generate a fourth combined image data for detecting at least one of the anomalies associated with the electrical distribution system.

14. A method, comprising:
capturing ultraviolet image data of at least a portion of an electrical system using an ultraviolet camera sensor;
capturing infrared image data of at least the same portion of the electrical system using an infrared camera sensor;
capturing visible light image data of at least the same portion of the electrical system using a visible light camera sensor;
combining at least two of the ultraviolet image data, the infrared image data, and the visible light image data to generate combined image data;
determining an anomaly in the electrical system based on the combined image data, wherein the anomaly comprises at least one of a corona discharge, a corona failure, or a temperature anomaly; and
storing the combined image data.

15. The method of claim 14, further comprising flying a vehicle comprising the ultraviolet camera sensor, the infrared camera sensor, and the visible light camera sensor along a power line of the electrical system while capturing at least one of the ultraviolet image data, the infrared image data, and the visible light image data.

16. The method of claim 14, further comprising generating a second combined image data by overlaying a portion of the ultraviolet image data on the infrared image data, wherein the determining further comprises determining the anomaly based on the second combined image data.

17. The method of claim 14, wherein the ultraviolet image data comprises high resolution ultraviolet image data and wherein the method further comprises determining a cause of the anomaly based on the high resolution ultraviolet image data.

18. The method of claim 14, further comprising generating a third combined image data by overlaying a portion of the ultraviolet image data and a portion of the infrared image data on the visible light image data, wherein the determining further comprises determining the anomaly based on the third combined image data.

19. The method of claim 14, further comprising alerting an operator based on at least one of the corona discharge, the corona failure, or the temperature anomaly, wherein the temperature anomaly comprises a temperature associated with an intensity value of a pixel of the combined image data that exceeds a temperature threshold value.

20. The method of claim 19, further comprising:
providing, to the operator, at least one output image based on the combined image data;
displaying the at least one output image; and
providing the operator with at least one image scaling option for adjusting the output image.

* * * * *